J. L. CREVELING.
ELECTRIC REGULATION.
APPLICATION FILED SEPT. 29, 1911.
1,265,884.
Patented May 14, 1918.
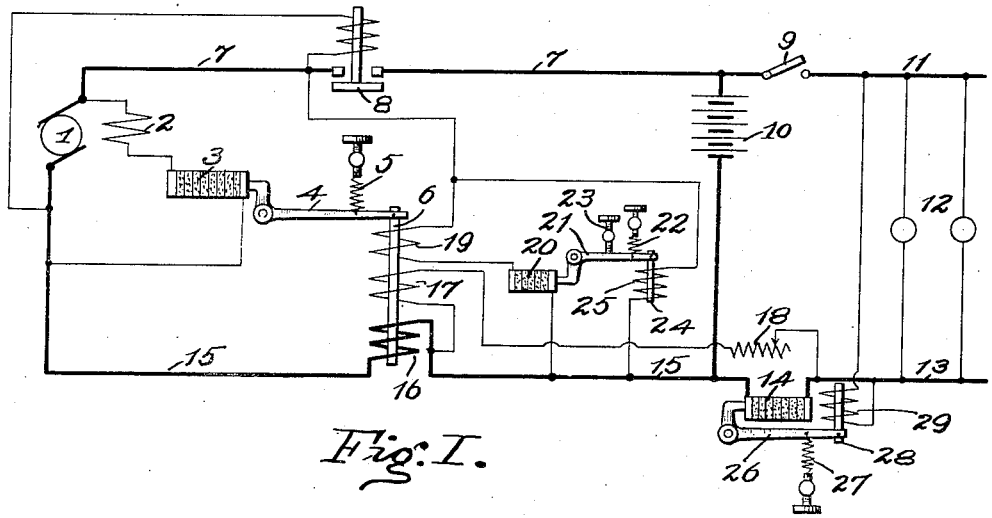
Fig. I.
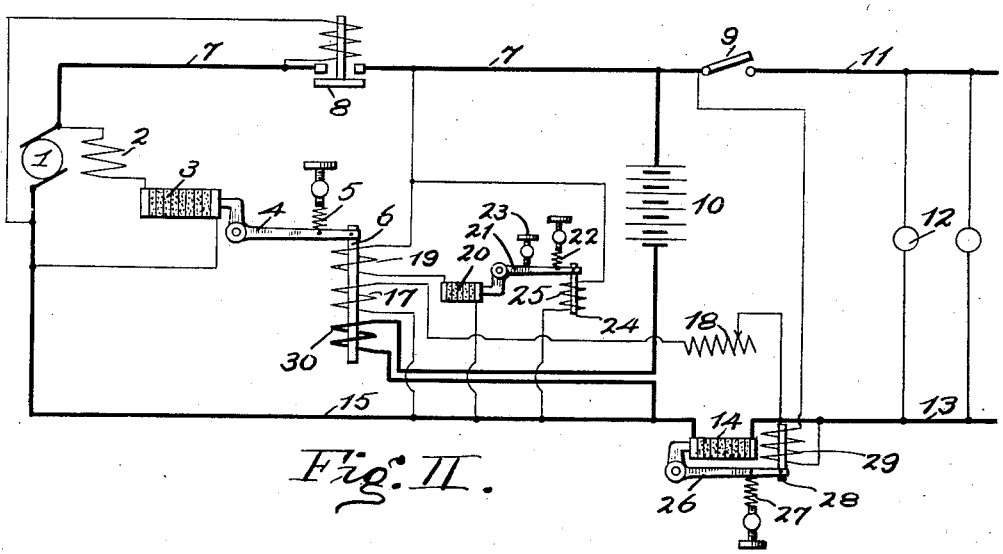
Fig. II.
WITNESSES
INVENTOR

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,265,884.　　　　　　　Specification of Letters Patent.　　Patented May 14, 1918.

Application filed September 29, 1911. Serial No. 651,895.

*To all whom it may concern:*

Be it known that I, JOHN L. CREVELING, a resident of New York, in the county and State of New York, have invented certain new and useful Improvements in Electric Regulations, as set forth in the annexed specification and drawing, forming a part thereof.

My invention pertains to that class of electric regulation wherein it is desired to regulate a dynamo or generator in a predetermined manner and has for its particular object to provide means for automatically thus regulating a dynamo.

As my invention is particularly applicable to systems of electric distribution wherein a dynamo is used to charge a storage battery and furnish current to lamps or other translating devices, it will be described in connection with such a system.

In the drawing, Figure I is a diagrammatic representation of one type of system embodying my invention.

Fig. II shows a modified form of the system shown in Fig. I embodying my invention.

In Fig. I, 1 represents a dynamo or generator provided with the usual field coil 2, having in series therewith the variable resistance 3, in this instance indicated as of the carbon pile variety. 4 is a lever normally drawn in an upward direction by the adjustable spring 5, in such manner as to tend to compress the carbon pile 3 and lower the resistance thereof. The lever 4 is provided at one extremity with a core of magnetic material 6 and thus motion imparted to the core 6 may be made to regulate the generator. 7 represents the positive lead of the generator which is carried to one side of the switch 8, which is preferably of the automatic variety adapted to close the circuit when the voltage of the generator is substantially that of the battery, and as many such switches are known in the art and the particular type of switch forms no part of my present invention one of the well known types is merely indicated diagrammatically. From the opposite terminal of the switch 8, the lead 7 is carried to one side of the translation circuit switch 9 and is connected with the positive side of the storage battery 10. From the switch 9 the main 11 is carried to the positive side of the translating devices 12, having their negative terminals in connection with the main 13, which is connected to one terminal of the translation circuit regulator, in this instance indicated as a carbon pile 14, having its remaining terminal connected with the negative lead 15 in communication with the negative side of the storage battery 10 and one end of the solenoid coil 16 from the opposite end of which the lead 15 continues to the generator 1. 17 is a fine winding or solenoid in shunt across the resistance 14 and having in series therewith the adjustable resistance 18. 19 is a coil in shunt across the generator or battery circuit and surrounding the core 6, in such manner as to tend to draw the same in a downward direction. The coil 19 has in series therewith the adjustable resistance 20 indicated as a carbon pile and controlled by the lever 21 normally drawn in an upward direction as by spring 22, in such manner as to tend to increase the resistance 20. 23 is an adjustable stop limiting the upward movement of the lever 21. The lever 21 is provided at one extremity with a core 24 surrounded by the solenoid 25 in shunt across the generator circuit. 26 is a lever normally drawn in a downward direction as by adjustable spring 27 in such manner as to tend to reduce the resistance 14. The lever 26 is provided at one extremity with a core of magnetic material 28 surrounded by a solenoid 29 in shunt across the translation circuit.

In the modification shown in Fig. II like numerals have been used to indicate like parts, and the only difference brought out in this modification is that the coil 16 in the main circuit is suppressed and the coil 30 in the battery circuit employed in its stead, and the coils 19 and 28 are shown in shunt across the battery and generator on the opposite side of the switch 8 to which they are shown in Fig. I.

An operation of my invention is substantially as follows, referring particularly to Fig. I:

If the generator be running and its voltage be sufficient to charge the storage battery, current will flow from the generator 1, through lead 7, switch 8, battery 10, lead 15, coil 16 and lead 15 to the generator, and I so adjust the spring 5 that when the maximum desired current is delivered to the battery by the generator any appreciable increase above this current in the coil 16 will cause the core 6 to be drawn downwardly against the action of spring 5 and increase the resistance 3 in such manner as to prevent this maximum current from being exceeded. If now the battery has been charged at this maximum current until its voltage has risen until the maximum voltage desired to have impressed across the battery circuit is reached, I so adjust the spring 22 that any appreciable increase above this desired maximum voltage will be prevented by the coil 25 depressing the core 24 against the action of spring 22 and decreasing the resistance 20 and thus increasing the current in the coil 19 which assists the coil 16, and, if the voltage of the battery now rise further, the current supplied thereto will taper off as the battery voltage rises. This maximum voltage desired to have across the battery and generator circuit when the battery is alone charging is quite in excess of the voltage of the battery when the same is furnishing current to the translation circuit and, therefore, quite in excess of the desired translation circuit voltage which is necessarily held substantially constant, and if now the battery be charging at its maximum voltage and the translation devices be thrown on by closing the switch 9, current will flow through lead 7, switch 9, main 11, translating devices 12, main 13, resistance 14 and lead 15, and I so adjust the spring 27 that current in the coil 29 will raise the core 28 and increase the resistance 14 in such manner as to produce the normal desired voltage across the translation circuit. This will cause a drop across the resistance 14 and current will flow in the coil 17, which is wound in such direction as to assist the coil 16 and, therefore, less current will be necessary in the coil 16 to cause the same to depress the lever 4 and increase the resistance 3, and thus the current regulation of the generator may have its standard adjusted according to the drop across the translation circuit regulator or the increase in battery voltage above the desired translation circuit voltage and the amount or value of such adjustment may be determined by properly proportioning the resistance 18. Therefore, if at any time when the generator is running and operating below the maximum charging voltage so that the generator is current regulated as distinguished from voltage regulated and supplying current to the lamps or translating devices, the current supplied by the generator to the battery and translating devices will have its value varied in accordance with the drop across the translation circuit regulator or the difference between the generator circuit voltage and the translation circuit voltage, and thus the more nearly these two voltages are together the greater will be the generator output and the greater difference between these two voltages the less the generator output, and in this way during the current regulation of the generator the current will be so adjusted by the operation of the lamp regulator that the coil 16 will cause a lesser loss or drop in voltage across the lamp regulator than would otherwise take place and the whole system will be operated at a lower voltage than that for which the pilot 20—25 is set to operate, with the result of corresponding economy.

The operation of the system shown in Fig. II may be readily understood from the operation above given with respect to Fig. I, it only being necessary to remember that it is the battery circuit current in the coil 30 which operates lever 4 and is adjusted by the action of the lamp regulator through the coil 17 instead of the total generator output.

I do not wish in any way to limit myself to the exact system set forth in this application merely to illustrate one type of system comprehending the essentials of my invention, for it will be obvious that wide departure may be made without departing from the spirit and scope of my invention which is as set forth in the following claims.

I claim—

1. The combination with a generator, a storage battery, a translation circuit and a regulator for the translation circuit, of means for regulating the generator, means for controlling said regulating means responsive to voltage fluctuations, means for controlling said regulating means responsive to current fluctuations, means for assisting the current responsive means embracing an adjustable resistance and a solenoid coil in shunt relation with the translation circuit regulator.

2. The combination with a generator, a storage battery, a translation circuit and a regulator for the translation circuit, of a generator regulating means, means for operating the said regulating means responsive to voltage fluctuations, means for operating said regulating means responsive to current fluctuations and means for varying the effect of the current responsive means embracing an adjustable resistance and solenoid coil in shunt relation with the translation circuit regulator.

3. The combination with a generator, a storage battery, a translation circuit and a regulator for the translation circuit, of a regulating element for controlling the generator, voltage responsive means for controlling said regulating element, current responsive means for controlling said regulating element and means for adjusting the point of operation of the current responsive means embracing an adjustable resistance and solenoid coil in shunt relation with the translation circuit regulator, 4. The combination with a generator, a storage battery, a translation circuit and a regulator for the translation circuit, of a means for controlling the electro-motive force of said generator, means for operating said controlling means for preventing the electro-motive force of said generator from exceeding a predetermined limit, means for operating said controlling means for preventing a useful current supplied by said generator from exceeding a predetermined limit and means whereby the value of the current held from being exceeded by the current responsive means and voltage responsive means is adjusted by the operation of the translation circuit regulator said last-named means comprising an adjustable resistance and a solenoid in shunt relation with the translation circuit regulator.

5. The combination with a generator having a field winding, a storage battery, a translation circuit and a translation circuit regulator, of means for controlling the generator comprehending a variable resistance in circuit with the field winding, means for controlling said variable resistance responsive to voltage fluctuations, means for controlling said variable resistance responsive to current fluctuations and means embracing an adjustable resistance and a solenoid in shunt relation with the translation circuit regulator, for modifying the current responsive controlling means.

6. The combination with a generator, a supply circuit and a translation circuit with a regulator therefor, of means for regulating the generator, means for operating the same responsive to current fluctuations, means for operating the regulating means responsive to voltage fluctuations and means embracing an adjustable resistance and a solenoid in shunt relation with the translation circuit regulator for modifying the current regulation of the generator affected by the voltage across said regulator.

7. The combination with a generator, a storage battery and a translation circuit with a regulator therefor, of a means for regulating the generator, means for controlling the regulating means to charge the battery upon a constant current circuit, means for controlling the regulating means to charge the battery upon a constant potential circuit and means embracing an adjustable resistance and a solenoid coil in shunt relation with the translation circuit regulator for adjusting the current regulating means affected by the voltage across said regulator.

8. The combination with a generator, a storage battery and a translation circuit with a regulator therefor, of means for regulating the generator responsive to voltage fluctuations, means for controlling the regulating means responsive to current fluctuations and means embracing an adjustable resistance and a solenoid coil in series relation with each other and in shunt relation with the translation circuit regulator adapted for adjusting the effect of the current responsive means and operating in conjunction with the voltage responsive means in response to fluctuations in voltage across the translation circuit.

JOHN L. CREVELING.

Witnesses:
M. HERSKOVITZ,
ANNA M. WALL.